No. 647,581. Patented Apr. 17, 1900.
J. PRATT.
TYPE WRITING MACHINE.
(Application filed Mar. 24, 1898.)
(No Model.) 6 Sheets—Sheet 1.

Witnesses:

Inventor
John Pratt

No. 647,581. Patented Apr. 17, 1900.
J. PRATT.
TYPE WRITING MACHINE.
(Application filed Mar. 24, 1898.)
(No Model.) 6 Sheets—Sheet 2.

Fig. 2

Witnesses:

Inventor:
John Pratt.

No. 647,581. Patented Apr. 17, 1900.
J. PRATT.
TYPE WRITING MACHINE.
(Application filed Mar. 24, 1898.)
(No Model.) 6 Sheets—Sheet 3.

Witnesses:

Inventor
John Pratt

No. 647,581. Patented Apr. 17, 1900.
J. PRATT.
TYPE WRITING MACHINE.
(Application filed Mar. 24, 1898.)
(No Model.) 6 Sheets—Sheet 4.

Witnesses:
Inventor
John Pratt

No. 647,581. Patented Apr. 17, 1900.
J. PRATT.
TYPE WRITING MACHINE.
(Application filed Mar. 24, 1898.)
(No Model.) 6 Sheets—Sheet 5.

Fig. 6

Witnesses:
J.E.W. Bowen
M.C. Pinckney

Inventor
John Pratt

No. 647,581. Patented Apr. 17, 1900.
J. PRATT.
TYPE WRITING MACHINE.
(Application filed Mar. 24, 1898.)
(No Model.) 6 Sheets—Sheet 6.

Witnesses:

Inventor
John Pratt

UNITED STATES PATENT OFFICE.

JOHN PRATT, OF NEW YORK, N. Y., ASSIGNOR TO THE HAMMOND TYPE WRITER COMPANY, OF SAME PLACE.

TYPE-WRITING MACHINE.

SPECIFICATION forming part of Letters Patent No. 647,581, dated April 17, 1900.

Application filed March 24, 1898. Serial No. 674,975. (No model.)

*To all whom it may concern:*

Be it known that I, JOHN PRATT, of the city of New York, borough of Brooklyn, county of Kings and State of New York, have invented certain new and useful Improvements in Type-Writing Machines, of which the following is a specification.

My invention relates to type-writing machines; and my improvements consist generally in special mechanism by which the type-plate is moved, through the action of the key-levers, to present its appropriate type at the proper place in relation to the platen, in means for automatically locking the type-plate in such position until after the impression has been made by the type, in certain features of the longitudinal letter-feed mechanism, and in the transverse line-feed or rotary mechanism of the platen.

My improvements also consist in certain other features and details of construction, as more particularly hereinafter described.

In the accompanying drawings.

Similar characters represent like parts in all the figures.

A is the base or table of the machine, on which is supported the framework B for sustaining the operating mechanism.

C C' are the type-levers, extending from the front of the machine to and near its back, the levers C alternating with the levers C' for a purpose hereinafter to be described.

The following is the printing or writing mechanism:

D is a short rock-shaft supported in bearings in a portion of the frame B above the rear arms of the key-levers. Secured to the shaft D and extending upward from the same is an arm E, provided with a cross-arm F, extending laterally from the arm E in opposite directions and on both sides of the shaft D. Secured to the shaft D near its front end is a cross-arm G.

H H' are two rock-shafts journaled, respectively, in two vertical standards near the center of the machine and in the two side standards B outside of and above the key-levers.

I I and I' I' are arms fixed to and extending backward from the shafts H and H'.

J J' are vertically-suspended frames hanging loosely from the free ends of the arms I and I', respectively, and with their lower horizontal bars extending, respectively, over two sets of key-levers.

K K' are bars loosely suspended from the respective ends of the cross-bar G and also passing loosely through holes in forward projections *a* of the frames J and J'. The bars K K' are provided with shoulders *b b* above the projections *a a*, against which shoulders the projections may strike when either of the frames J J' is raised and so that such raising of the frames and bars may rock the cross-bar G and the shaft D.

Figure 6:
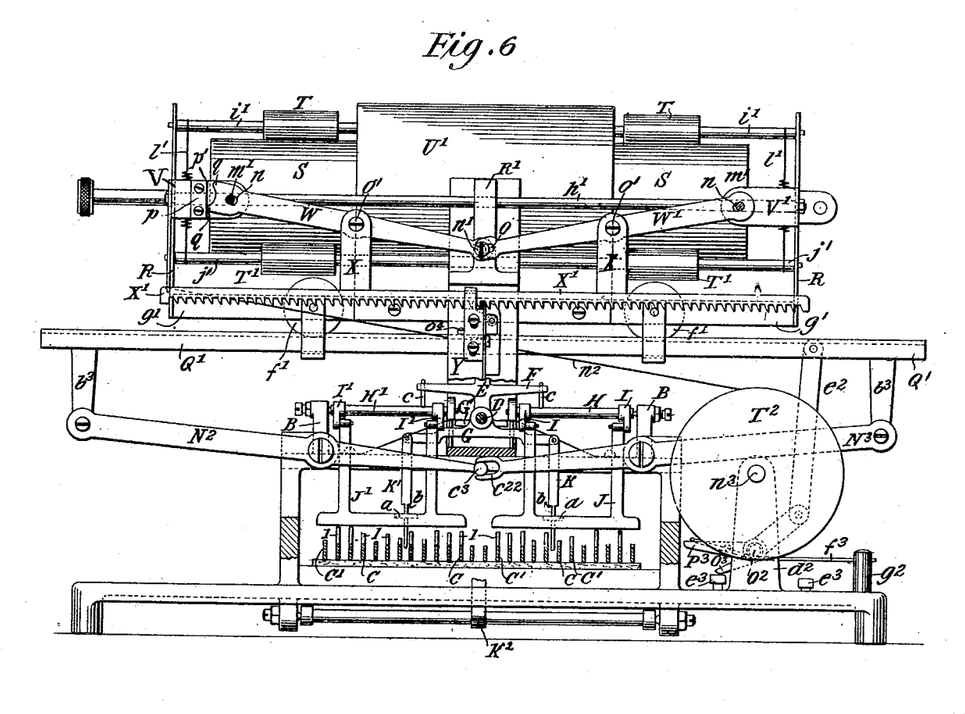
Fig. 6 is a similar view, but with the rear rock-shaft and its connecting parts removed and some of the other parts broken away.
Figures 7, 9, 10, 11:
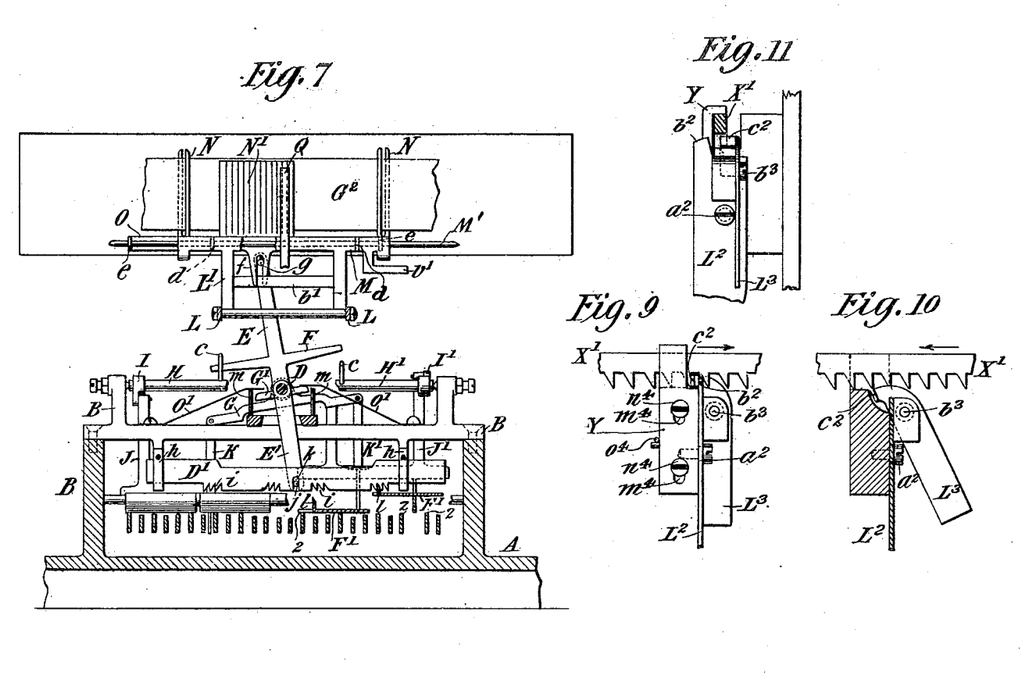
Fig. 7 is a detached view, partly in section, showing the type-carrier, the mechanism for giving it its vertical and lateral movements, the ribbon-carrier, and a portion of the ribbon and platen.
Figs. 9, 10, and 11 are details of longitudinal letter or rack feed mechanism.

The shafts H and H' are each provided with a bent finger *c*, which overlaps the bar F when said bar and the frames J and J' are in their normal positions, as shown in Fig. 6. When the frame J' is raised by any one of the key-levers under it, it will rock the shaft H' and its finger *c* forward, releasing the right arm of bar F from said finger, as shown in Fig. 7. The raising of the frame J' will cause its projection $a$ to strike the shoulder $b$ of the bar K' and raise said bar, thereby causing the right end of the bars F and G to rise, rocking the shaft D, and the arm E to move to the left. The reverse action and movements in the opposite direction of the arms G, F, and E will occur if the frame J be lifted by any one of the key-levers under it. These fingers $c\ c$ act as stops for the cross-bar F, the arm E, and the type-carrier on the return movements to their normal positions to prevent vibrations of the same. For example, when the finger $c$ of the shaft H' is retracted from the arm E, thus unlocking it, the finger $c$ of the shaft H, remaining in its normal position, acts as a stop for the left arm of the bar F on its return and the upright arm E and type-carrier to their normal positions.

L is a lever-frame journaled horizontally over the shaft D in brackets B'. The sides of the lever-frame are connected by a cross-bar $a'$. (See Figs. 1 and 3.)

L' is the frame for supporting the type-plate and ribbon-guide. This frame L' is pivoted to the rear portion of the lever-frame L, and its upper horizontal bar M is provided with lugs $d\ d$, supporting and frictionally retaining a horizontal rod M', and the two forks N, forming the ribbon-guide, extend around the rod M' and above the same and are parallel with each other.

N' is the type-plate, formed of a series of fingers united at their lower ends and adapted to slide bodily in the direction of the printing-line. The type-plate carrier is composed of a longitudinal bar O, to which the type-plate is secured, and having lateral lugs $e\ e$ at its ends, provided with holes through which the rod M' loosely passes. Extending downward from the bar O of the type-plate carrier is a fork or yoke $f$, and between the prongs of said fork a pin $g$ on the upper end of the arm E enters. If the rear portion of the lever-frame L be raised, the frame L', ribbon-guides N, type-plate carrier, and type-plate will all be raised. If the arm E be moved to the right or left, the type-plate carrier and type-plate through the pin $g$ and fork $f$ will be slid along in a corresponding direction on the rod M'. (See Fig. 7.) The above-described construction permits the type-plate to be instantly removed or replaced by drawing out the rod M' from the lugs $e\ e$ or replacing it in said lugs. The fork $f$ spans a horizontal bar $b'$ of the frame L', so that it will have a horizontal guide and support the type-plate in an upright position.

The type are preferably arranged in three couplets of two rows each, the first two upper and outer rows, constituting the upper couplet, being comprised of upper-case type or capitals, the next two rows, constituting the middle couplet, being comprised of lower-case type or small letters, and the lowest two rows, the lowest couplet, comprising type of numerals, punctuation-marks, &c. The frame L is provided with a downwardly-extending arm $c'$ in front of its journals, by which said frame and its supported mechanism can be lifted.

*Locking mechanism for the type-plate.*—D' is a longitudinal bar loosely supported and adapted to be guided horizontally in hangers $h$. The bottom edge of this bar D' is provided with several series of notches or teeth $i$.

E' is an arm secured to the front end of the shaft D, extending downward from the same and having a lateral pin $j$ near its lower end, which engages with a vertical recess or slot $k$ in the bar D', so that when the shaft D is rocked the arm E' will be moved to the right or left and carry the bar D' with it.

F' is a series of short levers, the cross-bars of which rest on the key-levers. Said levers F' correspond in number with the sets of notches $i$ in the bar D'. Each of these levers F' is provided with an upwardly-extending nib $l$ for engaging with the notches of its corresponding set, so that when any one of said levers F' is raised by a key-lever the type-plate N' will be moved, as hereinbefore described, and locked through the arms E and E' and bar D', so that the proper type will be back of the hammer and said bar will not be released until the locking-lever F' has dropped and its nib has become released from the notch $i$ with which it had been engaged.

The levers C C' are provided with upwardly-projecting nibs 1 and 2, situated under the frames J J' and the bar D', respectively. These nibs 1 and 2 are of different heights, being so regulated that when any key-lever C or C' is raised its nib 1 will be of the proper height to move the frame J or J' above it the proper distance, so that the type-plate N' will also be moved laterally the proper distance to get the appropriate type back of the hammer. The higher it is necessary to raise one of the frames by any particular key-lever the higher will be its nib 1, as the higher the nib the farther it will lift the frame. As it is necessary to lock the bar D' as soon as one of the frames J or J' has been lifted to the proper height, the nibs 2 are of corresponding height for the purpose of lifting the levers F' for their nibs $l$ to engage with the notches $i$. Arm E' is virtually a prolongation of arm E and is or may be of less length, the parts being so proportioned and arranged that whatever key is struck one of the nibs 1 will engage a notch $i$ to lock bar D' with the type-plate in position to print the desired letter. Also a notch $i$ in one set and a corresponding notch $i$ in an adjacent set correspond with two laterally-adjacent type. For example, if the type-plate N' is in such a position that a certain type on said plate is in a position to be struck by the hammer and one of the notches $i$ is locked by the nib $l$ of the lever F' under said notch the next laterally-adjacent type on the type-plate N' will be locked into position to be struck by the hammer when the notch $i$ of the next adjacent set of notches corresponding with the notch just previously locked is locked by the nib $l$ of the lever below said notch. I have shown in the drawings four sets of notches of three notches each and four stop-levers to correspond with said sets, there being twelve notches in all and each notch for two type.

The number of lateral positions of the type-plate is thirteen. One of these positions is normal, so that there are twelve positions to be determined by the locking device. These twelve positions may be had by employing one stop-lever on each side of the keyboard and six notches on each side of the stop-bar; but this would be objectionable on account of the minuteness of the notches necessary owing to the limited longitudinal movement of the bar D'. By having two stop-levers on each side there may be only three notches to a lever and the notches may be made twice as wide, as the number of notches to be engaged by any one locking device is but three and the longitudinal movement of the bar D' remains the same, thus securing greater certainty of operation. There might be three stop-levers and two notches to each or six stop-levers on each side with one notch to each, the number of locking positions being the same in either case; but I have found the arrangement described, and shown in the drawings, practically sufficient.

G' is a short cross-bar extending from the shaft D on both sides and parallel with the bars F and G.

O' O' are two flat springs secured to the machine-frame B and having their free ends extending over the respective arms of the bar G', and when said bar is in its horizontal and normal position said free ends of the springs O' rest upon the bar G' and upon fixed standards $m$ $m$. The rocking of the bar G' to the left will raise the right spring O' and depress the left arm of bar G', so that the left spring O' will be supported only by its standard $m$. The reverse actions will take place when the springs O' O' when the bar G' is rocked to the right. The two springs O' O' serve as tension-springs to return the arms E E' to their normal vertical positions and the type-plate to its normal central position on its supporting-frame.

*Hammer or type-striking mechanism.*—P is the hammer-shank, secured to a horizontal rock-shaft P' below and in front of the type-plate N', and Q is the hammer, having its striking-face $d'$ of a length to cover each vertical row of type on the plate N' and with its shank and shaft so situated that said hammer-face $d'$ when swung forward will strike evenly the front untyped surface of the plate N'. The hammer-face $d'$ is made long enough to cover all the type on one strip or finger of the type-plate, so that any type on said strip may be struck against the platen when the adjacent surface of said platen is brought nearest to a certain type. The shaft P' is provided with a lateral arm $e'$, (see Figs. 1 and 2,) by which said shaft is rocked and the hammer oscillated to strike the type-plate.

*Carriage-support and carriage.*—Q' is the long horizontal rail on which the rollers $f'$ of the paper-carriage rest and ride. These rollers have knife-edge peripheries and ride in a V-shaped groove in the top of the rail Q' to prevent lateral movement and slipping of the former on the latter. The rollers $f'$ are journaled on a horizontal plate $g'$, supporting two vertical end plates R R.

R' is a fixed vertical fork on the machine-frame and between the prongs of which passes the guide-rod $h'$ of the paper-carriage, said fork and rod guiding the carriage in its longitudinal movement. The end plates R R and the longitudinal plate $g'$ and rod $h'$ constitute the frame of the paper-carriage.

S is the rotary cylindrical platen, journaled in the end plates R R and situated back of and near to the type-plate N'.

T and T' are the frictional rollers engaging with the platen S and between which rollers and the platen the paper S' is adapted to be fed to and from the platen, respectively. The shafts $i'$ $j'$ of the rollers T and T' are journaled in slots $k'$ in the end plates R R, and said rollers are drawn toward each other and are kept in frictional contact with the platen S by coil tension-springs $l'$ $l'$, connecting said shafts $i'$ and $j'$, respectively. (See Figs. 5 and 6.)

U and U' are the feed-scroll and final guide for the paper S' and situated, respectively, under and back of the platen S. Said platen and the type-plate N' should be so situated relatively to each other that the third row of type or the upper row of the second couplet or "lower case" should meet tangentially the platen S when struck upon it by the hammer and when the type-plate and platen are in their normal vertical positions.

Figures 5, 8:
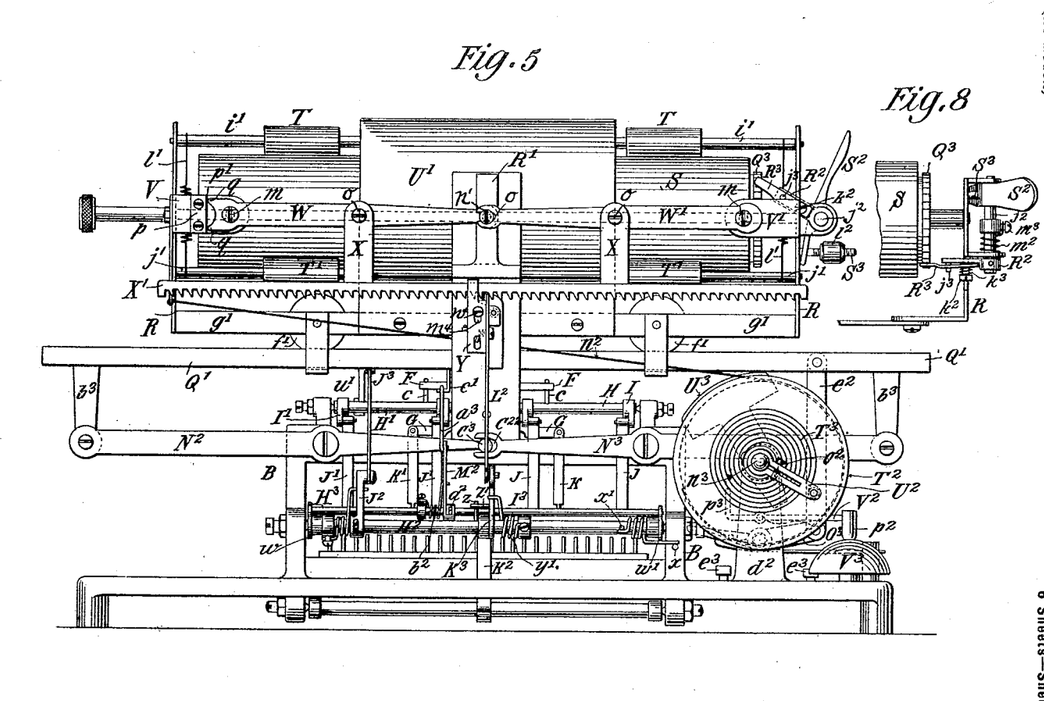
Fig. 5 is a rear elevation of the machine.
Fig. 8 is a detail in plan of the line-feed mechanism and one end of the platen.

*Paper-carriage and feed-rack.*—V V' are two brackets extending inward from the two ends R of the carriage-frame and back of the platen S and forked guide R'. To these brackets V V' are pivoted near their outer ends two levers W W' by screw-pins $m'$ in the brackets passing through elongated holes or slots $n$ in said levers. The arm W is provided near its inner end with a lateral pin $n'$, which engages with a fork or yoke $o$ in the inner end of the lever W'. About half-way between the ends of each of the arms W and W' is pivoted at $o'$ a downwardly-extending arm X, and secured to the lower ends of said arms X and at right angles to the same is the carriage feed-rack X'. Extending backwardly from the lower portion of the vertical fork R' is a bracket supporting a vertically-adjustable plate Y, having an upward extension with an inward flange on its upper end. The adjustable plate Y is provided with vertical slots $m^4$, through which pass the retaining-pins $n^4$, and a tension-spring $o^4$, secured to the bracket and bearing down on a pin on the plate Y, tends to keep the rack X' in its normal vertical position and allows said rack to be raised slightly for a large forward movement. The top of the bracket is provided with a groove immediately under and parallel with said flange. The rack X' is thus permitted longitudinal movement only, with the exception of the slight vertical movement allowed by the adjusting-plate Y, and said rack always in engagement with its operating mechanism. The carriage, with the platen, however, is permitted to have a vertical movement while the rack is stationary by reason of the levers W W' and the vertical arms X, the pivots $o'$ on said arms constituting fixed fulcra on which the equalizing-levers W W' operate, and the pins $m'$, slots $n$, and pin $n'$ and fork $o$ permitting the vertical movement of the carriage in spite of said levers rocking in arcs. In the practical operation of the machine the tension-spring is pulling on the carriage in the direction from the bracket V to the bracket V', and such pull would move the carriage in said direction and out of its proper position relatively with the rack X' if it were not for some compensating mechanism. This mechanism consists of an extension or block $p$ on the outer surface of the bracket V, having a straight vertical inner edge $p'$, forming a shoulder, and the adjacent end of the lever W provided with legs or extensions $q$ of equal length and both of which legs are in contact with said edge $p'$ when the carriage and levers W W' are in their normal positions, as shown in Fig. 5. When the carriage is raised, as shown in Fig. 6, the outer end of the lever W will move upward in an arc, the lower leg $q$ moving outward against the edge or shoulder $p'$ of the block $p$ and pushing said block and the carriage in a direction the reverse of the letter to letter-feed, fully compensating for the pull on the carriage by the tension-spring in the opposite direction.

*The ribbon-feed.*—Z Z' are two vertical stationary spindles extending through the plate Y' and supported or stepped in the sides of the machine-frame and on a line in front of the ribbon-guide N.

$A^2 A^3$ are two levers resting upon the plate Y', their respective fulcra being the two spindles Z Z', which pass freely through said levers and on which they freely rock.

$B^2 B^3$ are sleeves loosely surrounding the spindles Z Z', respectively, and provided at their lower ends with disks $r\ r'$, which rest upon the levers $A^2 A^3$.

$C^2 C^3$ are clutch-pawls pivoted, respectively, to the inner arms of the levers $A^2 A^3$, the clutches on the outer arms of said pawls engaging with the disks $r\ r'$, respectively, and $q'$ are pins extending upward from the levers $A^2 A^3$, back of the clutches of the pawls $C^2 C^3$, to limit the movements of said clutches in a backward direction relatively to their supporting-levers $A^2 A^3$.

Figures 1, 12, 13, 14:
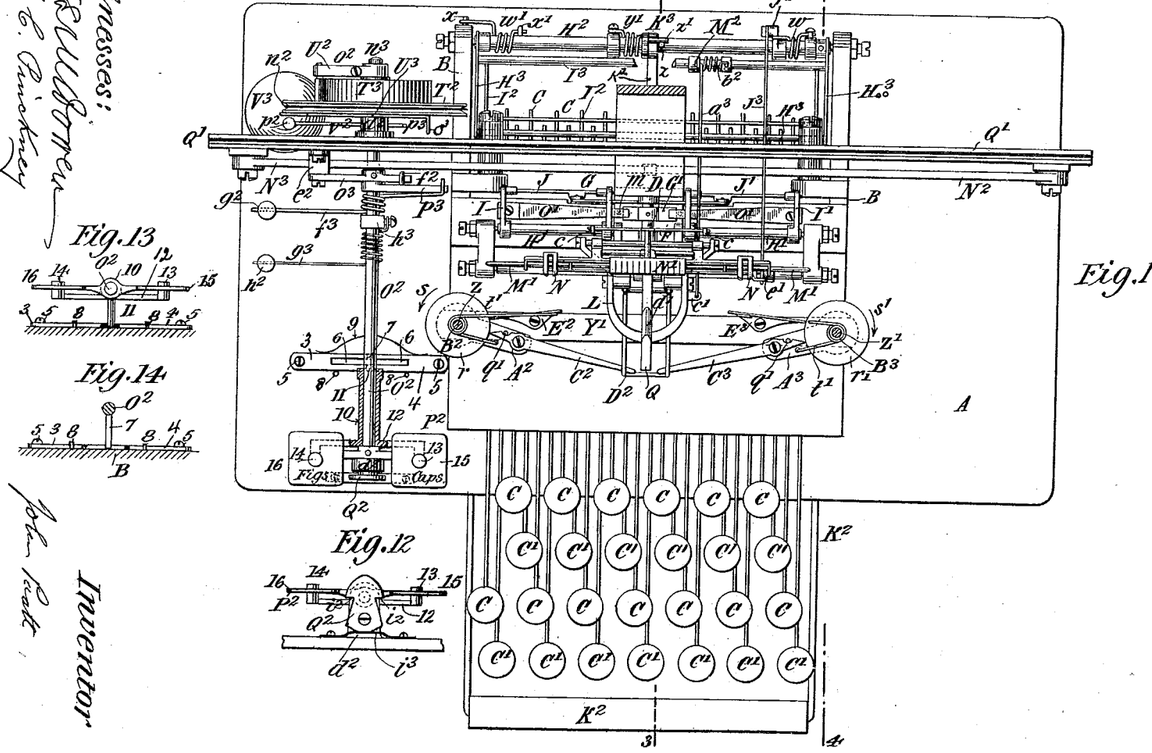
Figure 1 illustrates a plan view of my improved type-writing machine, but with the paper-carriage and carriage-feed removed.
Figs. 12, 13, and 14 are detail views of the mechanism for locking the carriage in its normal position and for unlocking the same, so that it may be raised or lowered.
Figure 2:
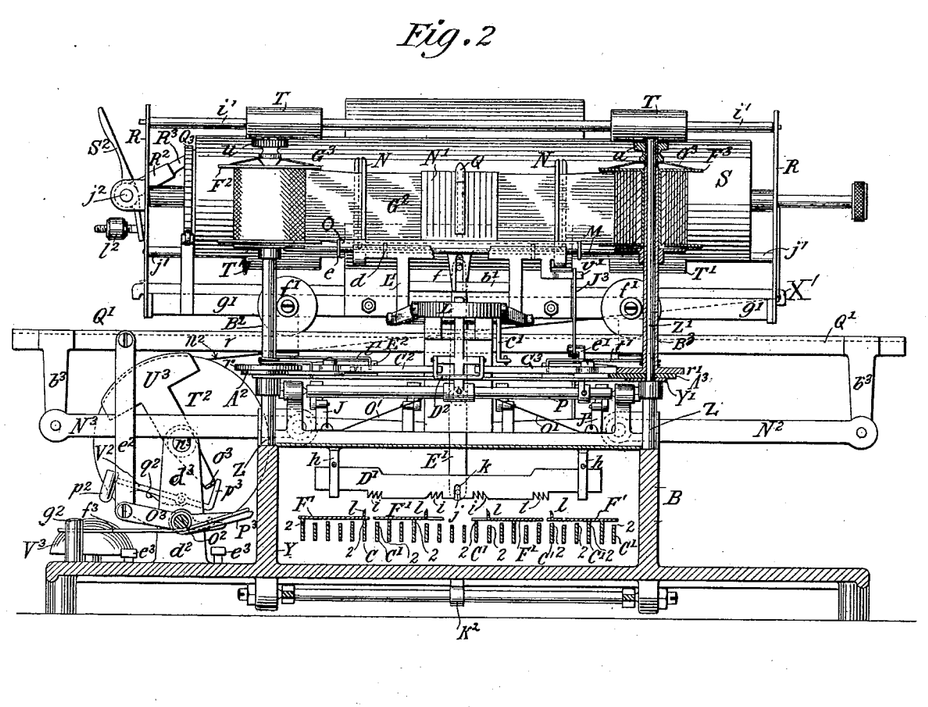
Fig. 2 is a front elevation of the entire machine, except that the key-levers are shown in transverse section and the right-hand ribbon-spool, sleeve-shaft, and clutch mechanism are shown in vertical section.
Figure 3:
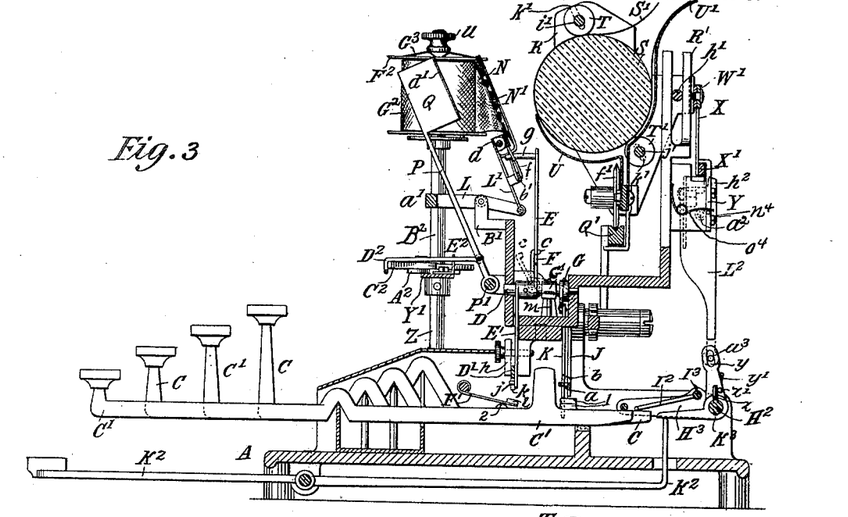
Fig. 3 is a transverse or fore-and-aft vertical section of the machine through the line 3 3 of Fig. 1.
Figure 4:
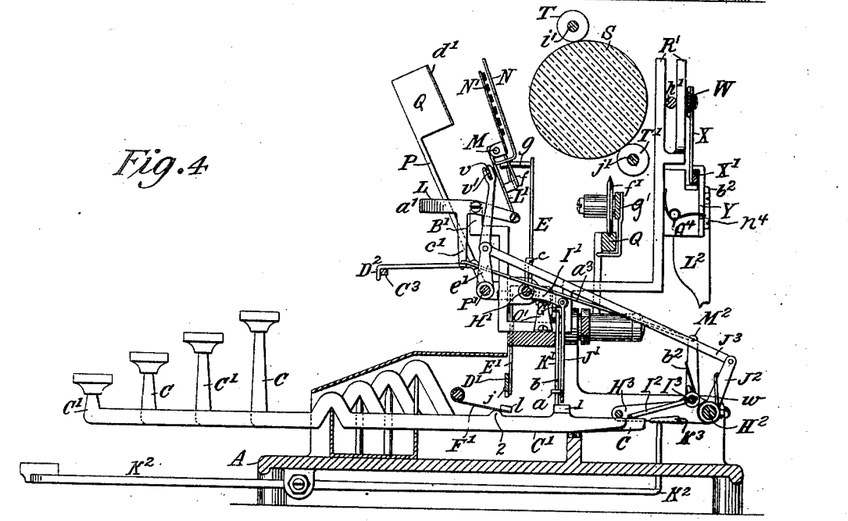
Fig. 4 is a similar section through the line 4 4 of Fig. 1.

$D^2$ is a rectangular frame loosely pivoted near one end, Figs. 1, 2, and 3, to the hammer-shank P and the two parallel forwardly-extending sides of the frame $D^2$ bent or hooked downward, Figs. 2, 3, and 4, and engaging with the inner arms of the levers $C^2 C^3$, respectively, with the said parallel arms resting upon said clutch-pawls. The striking movement of the hammer-shank P will thus move the long inner arms of the pawls $C^2 C^3$ and cause their clutches to rotate the disks $r\ r'$ and their supporting-sleeves $B^2 B^3$ in opposite directions and as shown by the arrows $s\ s'$, Fig. 1.

$E^2 E^3$ are clutch-detents pivoted to the plate Y' and with their outer or clutch ends bearing, respectively, against the peripheries of the disks $r$ and $r'$. Tension-springs $t\ t'$, attached at both ends, respectively, to the levers $A^2 A^3$ and to the detents $E^2 E^3$, tend to force said levers, with their supporting clutch-pawls, outward away from the disks and the detents $E E^3$ in engagement with the disks, so that said parts will be automatically returned to their normal positions without revolving the disks and their sleeves, which support the ribbon-spools. The movement of the inner ends of the pawls $C^2 C^3$ backward will cause their clutches to rotate the disks $r\ r'$ in the direction of the arrows $s\ s'$, the peripheries of said disks riding over the outer ends of the detents $E^2 E^3$ against the action of the two springs. As soon as the above movements are discontinued the springs $t'\ t'$ reverse the movements of the clutch-pawls and at the same time press the detents $E^2 E^3$ closely against the periphery of the disks and bind them from movements in directions the opposite from those indicated by the arrows $s\ s'$.

$F^2 F^3$ are the ribbon-spools around which the ribbon $G^2$ is wound. These spools loosely surround the sleeves $B^2 B^3$, respectively, and rest upon flanges on said sleeves. Spring or other friction-washers $G^3$ rest upon the tops of the spools, and nuts $u$ on the upper ends of the sleeves are adapted to bear said washers down on the spools, so as to bind them against the flanges on the sleeves. When so bound, the spools will revolve with said flanges and the sleeves bearing the same; but when the washers are loosened by their nuts the sleeves are free to revolve independently of the spools. When one spool is tightened on its sleeve, the other should be loosened, so that the ribbon may be wound from the loosened spool onto the tightened one, and in this case both spools will travel in the same direction, while the sleeve of the loosened spool will travel in the opposite direction. The ribbon $G^2$ between the spools in its practical working position is through the guide-forks N and back of the type-plate. (See Figs. 2, 3, and 7.

*Mechanism for operating the hammer, raising the type-carrier, and giving the letter-spacing.*—$H^2$ is a horizontal rock-shaft journaled loosely at the rear of the machine in the standards B B.

$H^3$ is a rectangular frame having its two parallel side arms secured to the shaft $H^2$ and the front cross-bar of said frame resting upon all the key-levers except the spacing-lever.

$I^2$ is a rectangular frame having its rear bar $I^3$ pivoted to the side arms of the frame $H^3$ in front of and near the shaft $H^2$ and its front bar resting on the longer key-levers C and beyond the shorter key-levers C'.

$J^2$ is an upwardly-extending arm loosely journaled upon the shaft $H^2$.

$J^3$ is an angle-bar pivoted at its apex to the arm $e'$, extending upward from the hammer-shaft $p'$. (See Figs. 1, 2, and 4.) The front end of the bar $J^3$ is provided with a laterally-extending fork $v'$, which engages with a lug $v'$ on the type-plate frame L'. The outer end of the bar $J^3$ is pivoted to the arm $J^2$. The movement of said arm in either direction—backward or forward—will correspondingly and in unison move the hammer Q, the ribbon fork N, type-plate N', and feed the ribbon through the instrumentality of the frame $D^2$ and clutches $C^2$ $C^3$. A coil-spring $w$ surrounds the shaft $H^2$ and has one end secured to a nut adjustably fixed on said shaft and the other end of which bears outwardly upon the front edge of the arm $J^2$, Figs. 1, 4, and 5. A coil tension-spring $w'$ surrounds the shaft $H^2$, one end of which bears upon a lateral pin $x$ in the upright B, and the other end bearing on the under side of a lateral pin $x'$ on the back of the shaft $H^2$. This spring $w'$ tends constantly to bear the cross-bar of the frame $H^3$ down on the key-levers C C'.

$K^2$ is the spacer-lever, extending under the levers C C' and parallel with the same and extended upward at its rear end back of the levers C C'.

$K^3$ is a bell-crank lever having a collar at its apex, which loosely surrounds the shaft $H^2$, which forms the fulcrum for said lever. The forwardly-extending arm of said lever rests upon the rear arm of the space-key lever $K^2$. The upwardly-extending arm of the lever $K^3$ is provided with a slot $y$ for a purpose hereinafter to be described. A coil tension-spring $y'$ surrounds the shaft $H^2$, one end of which is secured to an adjustable nut on said shaft and the other bears against the rear edge of the upright arm of the lever $K^3$, forcing the lateral arm of said lever constantly down upon the spacer-lever $K^2$. A projecting pin $z$ on the shaft $H^2$ bears against the front side of a pin $z'$, extending laterally from the upwardly-extending arm of the lever $K^3$, whereby a backward rocking of the shaft $H^2$ by any of the key-levers C or C' or from any other cause will cause the lever $K^3$ to also rock backward. The spring $y'$ will return it to its normal position.

$L^2$ is a lever pivoted to the side of the bracket which supports the plate Y at $a^2$. A lateral pin $a^3$ on the lower arm of said lever engages with the slot $y$, and a dog or nib $b^2$ on the end of the upper arm of said lever is adapted to engage with the rack X'. A second dog-lever $L^3$ is pivoted to the lever $L^2$ at $b^3$, and the upper end of said lever $L^3$ is provided with a nib $c^2$, that normally engages with the rack X', Figs. 5, 6, 9, 10, and 11. The lever $L^3$ is so pivoted below said rack as to allow said rack to ride freely in the reverse direction of the feed movement, as shown by the arrow, Fig. 10, the rack by this movement releasing itself from the nib $c^2$ and riding over the top of lever $L^3$, which will swing down for this purpose. Figs. 10 and 11 show the normal positions of the parts, the nib $c^2$ of the lever $L^3$ being in engagement with the rack and the nib $b^2$ of lever $L^2$ being out of engagement with the same. The feed of the rack and carriage in the direction of the arrow, Fig. 9, will cause the nibs $b^2$ and $c^2$ of levers $L^2$ $L^3$ to alternately engage with the rack X and to feed the same tooth by tooth and letter by letter. The above-stated feed is caused by operating the spacing-lever $K^2$ and through it the levers $K^3$ and $L^2$, as above described. By this action the shaft $H^2$ is not operated, as the lever $K^3$ is loosely journaled on the same. The feed is also accomplished by operating any of the key-levers C or C', which will rock the shaft $H^2$ and through the pins $z$ and $z'$ rock the levers $K^3$ and $L^2$.

$M^2$ is an arm which is loosely fulcrumed on the rear side or shaft $I^3$ of the frame $I^2$ and attached to said shaft by a pin-and-slot connection $a^2$ (see Fig. 5) to permit of a slight rotary play of said arm and shaft in relation to each other. The upper end of the arm $M^2$ is connected with the depending arm $c'$ of the lever-frame L by a connecting rod or link $a^3$. A coil tension-spring $b^2$ surrounds the shaft $I^3$, one end of which is secured to an adjustable nut on said shaft and the other bears lightly against the front edge of the arm $M^2$.

Operation: If one of the short key-levers C' be operated, the frame $H^3$ will be raised and turn the shaft $H^2$ backward, (the frame $I^2$ and $M^2$ remaining stationary,) and said movement of the shaft $H^2$ will, through pins $z'$ and $z$, move the lever $K^3$ and dog-levers $L^2$ and $L^3$ and feed the carriage the space of one tooth and letter. The same rotary movement of the shaft $H^2$ will cause the spring $w$ to push yieldingly backward the arm $J^2$ and through the arm $J^3$ draw backward the ribbon-guide N, with the ribbon, and also draw forward the hammer Q, giving a yielding blow against the ribbon and type-plate N', and also through the frame $D^2$ and clutches $C^2$ $C^3$ feed the ribbon, the striking of the hammer Q against the ribbon taking place immediately after the feeding of the carriage and ribbon and of the drawing backward of the ribbon-guide. The free end of the spring $w$ acting directly upon the arm $J^2$ causes said spring to positively contract against its normal condition, and the pressure exerted by it on the arm $J^2$ is a pressure against the more or less yielding resistance of the spring, which yields the more in proportion to the suddenness of the stroke. The resistance of the spring $w$ is regulated by the adjustable nut or collar. When any one of the longer levers C is operated, both frames $H^3$ and $I^2$ are raised. The raising of the frame $H^3$ causes the operations above described and in addition to said operations causes the inner frame $I^2$ to rise, turning back the arm $M^2$ and through the connecting-rod $a^3$ and arm $c'$ raising the back end of the frame $L'$, type-plate $N'$, and ribbon-guide $N$ the space between two rows of type and to the next upper row. The manner of moving the type-plate $N'$ laterally or bringing it into position for the hammer to strike the plate opposite the appropriate type has been heretofore stated. The nib $l$ on the lever $F'$, which is raised by the key-lever, engages with one of the notches or teeth $i$ of bar $D'$ at the end of its longitudinal movement, and thus locks the shaft $D$ and the type-plate $N'$, with the appropriate type, back of the hammer until the key-lever is released.

*Means for raising the carriage-support.*—Pivoted to the rear of the frame $B$ under the rail $Q'$ are two equalizing-levers $N^2 N^3$, their outer ends being pivoted to downward extensions $b^3$ from the rail $Q'$. The inner end of the arm $N^3$ is provided with a fork $c^{22}$, in which a roller or pin $c^3$ on the inner end of lever $N^2$ engages.

$O^2$ is a rock-shaft pivoted in standards $d^2 d^3$ at right angles with the rail $Q'$.

$O^3$ is a cross-arm lever fixed to the shaft $o^2$, one arm of said lever being connected by a connecting-rod $e^2$ with the rail $Q'$. Adjustable screws $e^3$ under the respective arms of the lever $O^3$ serve to limit the downward movements of said arms when so turned by the shaft $O^2$.

$P^2$ is a cross-bar fixed to the shaft $O^2$ near its front end and parallel with the cross-lever $O^3$. The right arm of bar $P^2$ when depressed, so that the corresponding arm of lever $O^3$ is stopped by the screw $e^3$, causes the rail $Q'$ and the paper-carriage and platen $S$, supported thereon, to move in vertical planes by reason of the equalizing-levers $N^2 N^3 W W'$, the rack $X'$ remaining stationary and the carriage moving independently of the same until the uppermost row of type (upper row of capitals) is tangential with the platen $S$ when struck upon it by the hammer. If one of the longer key-levers $C$ be raised the distance between two rows of type, as above described, the lower row of the capital type will be in a position to be struck against the platen $S$ by the hammer. If the left arm of the bar $P^2$ is depressed, so that the corresponding arm of lever $O^3$ is stopped by the screw $e^3$, the rail $Q'$ will be drawn down, the carriage and platen $S$ dropping vertically by reason of the equalizing-levers until the uppermost row of numeral-type (next to lowest row) is in a position to be struck by the hammer against the platen. The lifting of one of the longer key-levers $C$ will raise the type-plate in a position for the lowest row of type (numerals) to be struck by the hammer. Thus by moving both the platen and the type-plate across the printing-line in the manner described both upper and lower rows of the three type-couplets are readily brought to proper relation with the platen for printing.

$P^3$ is an arm loosely journaled on the shaft $O^2$ and having a lateral pin $f^2$ overlapping and resting on the free arm of the lever $O^3$. A coil tension-spring $f^3$ surrounds the shaft $O^2$, with one end bearing downward in its fixed support $g^2$ and its other end overlapping and bearing downward the arm $P^3$. Another coil-spring $g^3$ surrounds the shaft $O^2$, with one end bearing downward in its fixed support $h^2$, while its other end is secured to an adjustable collar $h^3$ on said shaft. The spring $f^3$ serves to help raise the weight of the carriage and its supporting-rail $Q'$ when being lifted and to render the raising of said rail and carriage easier. The spring $g^3$ is preferably lighter than spring $f^3$, but acts in the same direction on shaft $O^2$, Fig. 1. Spring $g^3$ is adjustable by means of the collar $h^3$, so that the lifting force of the springs on the carriage may be adjusted. The combined strength of these springs must be such as to allow the rail and carriage to return to position with the type of the lower-case or small letters ready to be acted on by the hammer.

$Q^2$ is a small lock-plate pivoted to the front of the standard $d^2$ between the two arms of lever $P^2$ and provided with notches $i^2$ on either side. Said plate can be turned by the hand of the operator to the right or left, and when done after the cross-bar $P^2$ has been turned the right or left notches will overlap the right or left key-plate of the bar $P^2$, respectively, and lock the same in this position. The plate $Q^2$ is also provided with a horizontal bottom edge and beveled corners, which rest upon a flat tension-spring $i^3$ when the plate $Q^2$ is in either a vertical position or in an oblique position in either direction, locking the bar $P^2$, the tension-spring $i^3$ materially assisting in holding the plate $Q^2$ in its locked position.

In order that the movement of the paper-carriage may come to an immediate and abrupt stop when it has reached its normal position on returning from a raised or lowered position, the following mechanism is devised:

3 4 are two stop-arms pivoted on either side of the shaft $O^2$ at 5 5 to the base-plate $A$ and almost meeting each other under said shaft when at right angles with the same. Each arm 3 and 4 is provided with a longitudinal slot or slit 6, extending from its free end toward its pivot. The shaft $O^2$ is provided with a downwardly-extending arm 7 of a width at its lower end a little less than that of the slots 6, whereby it may ride in said slots. The ends of the bars 3 and 4 to the rear of the slots 6 correspond with the straight sides of the arm 7, and said ends are of a distance apart just sufficient to permit the free entrance of said arm between them when the arms 3 and 4 are in line with each other and to lock said arm 7 from lateral movement. The arms 3 and 4 when in their normal positions in line with each other and at right angles with the shaft $O^2$ rest against stop-pins 8 8 in front of said arms. A tension-spring 9, bearing on the rear edges of said arms, tends to keep them in their normal positions against the stop-pins 8.

10 is a sleeve incasing the shaft $O^2$ between the arms 3 4 and the cross-bar $P^2$. From the rear end of said sleeve is a downwardly-extending arm 11, having preferably a circular perimeter at its lower end and which when the arms 3 and 4 are in their normal positions is between the free ends of said arms in front of the slots 6, which are beveled from said slots toward the pivots 5 5 of the respective arms. The forward end of the sleeve 10 is provided with a yoke 12, the upwardly-projecting fingers 13 14 of which pass through the shift-keys 15 and 16, respectively, (on the bar $P^2$,) and extend a slight distance above said keys.

If the above-named parts are in their normal positions and it be desired to raise the paper-carriage, the finger 13 is depressed, rocking the sleeve, and the arm 11 will move to the left against the beveled end of arm 3, pushing back said arm and unlocking the arm 7. A further pressure will bring the finger or thumb against the key 15, and the depression of such key will rock the shaft $O^2$ and raise the carriage, as hereinbefore described, the slot 6 in the arm 3 permitting the swinging movement to the left of the depending arm 7. As soon as pressure is removed from the finger 13 and key 15 the parts will be returned to their normal positions by the tension-springs, as above described, and the arm 7 will be automatically locked between the ends of the arms 3 and 4, thus automatically and abruptly locking the shaft $O^2$ and the carriage from vertical movement. Similar results will follow if the finger 14 and key 16 be depressed, except that such action will turn the arm 11 to the right and the carriage will be lowered instead of being raised, the arm 4 will be swung back by the depending arm 11, and the arm 7 will ride in the slot 6 of said arm 4.

*Mechanism for feeding the paper from line to line.*—$Q^3$ is a ratchet secured to the rotary cylindrical platen S.

$R^2$ is an arm fixed to a rock-shaft $j^2$ in the paper-carriage, extending transversely with the platen S and provided with a lateral pin $j^3$.

$R^3$ is a pawl pivoted to the side of the arm $R^2$ back of the pin $j^3$ at $k^2$, with said pin extending loosely through a hole in said pawl, the free end of the same engaging with the teeth of the ratchet $Q^3$. A coil tension-spring $k^3$ surrounds the pivot $k^2$ and bears the pawl yieldingly against the arm $R^2$ and the ratchet $Q^3$, permitting said pawl to partake of the circular movement of the ratchet and also to return it to its normal position for a new engagement.

By the construction described the pawl $R^3$ is movable by and with arm $R^2$, but is yielding in relation thereto.

$S^2$ is a cross-arm lever fixed to the shaft $j^2$, with its upper arm extending outwardly from the paper-carriage and the lower arm forked and yoking an outwardly-extending screw-rod $S^3$, an adjustable nut $l^2$ on said rod serving to limit the outward movement of the lower arm of the lever $S^2$ and the consequent downward movements of the arm $R^2$ and pawl $R^3$ and the rotary movement of the ratchet and platen. The pressure of the upper arm of lever $S^2$ toward the end of the platen S forces down the arm $R^2$ and pawl $R^3$ against the ratchet $Q^3$ and rotates the same and the platen S. A coil tension-spring $m^2$ surrounds the shaft $j^2$, has one end secured to an adjusting-collar $m^3$ on said shaft, and its other end normally bearing the pawl $R^3$ through the arm $R^2$ against the ratchet $Q^3$. When the pressure on the upper arm of the lever $S^2$ is removed, the spring $m^2$ will return said lever and the arm $R^2$ and pawl $R^3$ to their normal positions and so that said pawl will be ready to operate the ratchet again. The line-to-line feed of the paper by rotating the ratchet $Q^3$ is accomplished by pressing the upper arm of lever $S^2$, as above stated, in pushing back the carriage to begin a new line of printing, and as the movements of the lever $S^2$ and the arm $R^2$ and pawl $R^3$ are limited by the nut $l^2$, against which the lower end of lever $S^2$ strikes, the platen S is thus rotated a distance which is determined by the adjustment of said nut.

*Alarm mechanism.*—$T^2$ is the usual spring-drum for winding up the cord $n^2$, which draws the paper-carriage back on its longitudinal feed, drawing its rack X' against the dogs $L^2$ $L^3$. The arbor $n^3$ of the spring $T^3$ is supported on the standard $d^2$ above the shaft $O^2$, and said arbor forms the journal around which the drum $T^2$ revolves. The outer end of the cord $n^2$ is secured to the right-end plate R of the paper-carriage. The coil-spring $T^3$ is secured at its inner end to its arbor $n^3$. A slotted bar $U^2$ extends over the arbor $n^3$ and is adjustably fixed to said arbor by means of a tension-screw $o^2$, passing through said bar and slot, by which said bar may be tightened and loosened on the arbor. The outer end of the spring $T^3$ is attached to the bar $U^2$, and the adjustability of said bar will provide means for adjusting the tension of the spring $T^3$, as will be readily seen.

$U^3$ is a cross-bar loosely journaled on the arbor $n^3$ and kept in frictional contact with the drum $T^2$ by means of said drum, the spring $T^3$, and the adjusting-bar $U^2$. One arm of the bar $U^3$ is provided with a forward extension $o^3$ and the opposite arm of said bar extends a little beyond the periphery of the drum $T^2$ in order that it may be easily turned by hand.

$V^2$ is the bell-hammer lever pivoted to the standard $d^2$, having the hammer $p^2$ on one arm and its opposite arm provided with an upward extension $p^3$, against which the extension $o^3$ of the bar $U^3$ is adapted to engage. The bell $V^3$ is situated under the hammer $p^2$, and a spring $q^2$, bearing on the under side of the hammer-lever $V^2$, tends to keep said hammer out of contact with the bell. The revolution of the drum $T^2$ in drawing the paper-carriage to the left causes the bar $U^3$ to correspondingly revolve until the projection $o^3$ on said bar strikes the extension $p^3$ on the hammer-lever $V^2$, raising the hammer $p^2$, and said extension $p^3$, as soon as released from the projection $o^3$, allows the hammer $p^2$ to fall and strike the bell $V^3$. The cross-bar $U^3$ can be so turned by hand that the projection $o^3$ may be made to strike the extension $p^3$ of the hammer-lever, and also to ring the bell at any point in the longitudinal movement of the paper-carriage.

What I claim as new, and desire to secure by Letters Patent, is—

1. In a type-writer, the combination of a type-carrier, mechanism for giving said carrier a movement along the line of print, key-levers for operating said mechanism, a notched or serrated bar connected with said mechanism, and a cross-bar resting on said key-levers and provided with a projection for engaging with said notches, all as and for the purposes set forth.

2. In a type-writer, the combination of a type-carrier, mechanism for giving said carrier a movement along the line of print, key-levers for operating said mechanism, a bar connected with said mechanism and provided with two or more sets of notches, cross-bars resting on the key-levers, one cross-bar for each set of notches and each having a projection for engaging with the notches of its appropriate set, all as and for the purposes set forth.

3. In a type-writer, the combination of a type-carrier, mechanism for giving said carrier a movement along the line of print, key-levers for operating said mechanism, a bar connected with said mechanism and provided with two or more sets of notches, cross-bars resting on the key-levers, one cross-bar for each set of notches and each having a projection for engaging with the notches of its appropriate set, and the notches so arranged relatively to the type on the carrier, that two adjacent type will be in proper positions for printing consecutively when similar notches of two sets of the same are engaged consecutively by the two projections of their two respective cross-bars, all as set forth.

4. In a type-writer, the combination of a type-carrier, mechanism for giving said carrier a movement along the line of print, key-levers for operating said mechanism, a bar connected with said mechanism and provided with two or more sets of notches, cross-bars resting on the key-levers, one cross-bar for each set of notches and each having a projection for engaging with the notches of its appropriate set, and the notches of each set being so arranged that the longitudinal movement of the bar the distance between two adjacent notches will move the type-carrier the distance of two type, all as set forth.

5. In a type-writer, the combination of a type-carrier, mechanism for giving said carrier a movement across the line of print, mechanism for giving the carrier a movement along said line, a notched or serrated bar connected with said mechanism, and a cross-bar adapted to be raised directly by the key-levers and provided with a projection for engaging with said notches, all as and for the purposes set forth.

6. In a type-writer, the combination of a type-carrier, mechanism for giving said carrier a movement along the line of print, a notched or serrated bar connected with said mechanism, and a cross-bar adapted to be raised by the key-levers, and provided with a projection for engaging with said notches, a platen, and mechanism for giving said platen a movement across the line of print, all as and for the purposes set forth.

7. In a type-writer, the combination of a type-carrier, mechanism for giving said carrier a movement across the line of print, mechanism for giving said carrier a movement along said line, a notched or serrated bar connected with said mechanism, and a cross-bar adapted to be raised by the key-levers and provided with a projection for engaging with said notches, a platen, and mechanism for giving said platen a movement across the line of print, all as set forth.

8. In a type-writer, the combination of a laterally-movable type-carrier, a rock-shaft, an arm extending on one side of said shaft and connected to the type-carrier so as to move it, an arm extending oppositely to the first-mentioned arm, a notched bar movable longitudinally connected to the oppositely-extending arm so as to be moved thereby, a bar having a projection to engage said notches, and key-levers adapted to raise the bar having said projection, as set forth.

9. In a type-writer, the combination of a laterally-movable type-carrier, a rock-shaft for imparting to said carrier its lateral movement, an arm secured to said shaft, a notched or serrated bar connected with said arm, and the notches arranged in sets, a series of bars one for each set of notches and adapted to be raised by the key-levers, and each bar having a projection for engaging with said notches, all as set forth.

10. In a type-writer, the combination of a laterally-sliding type-carrier, a rock-shaft for imparting to said carrier its lateral movement, a cross-bar extending on opposite sides of said shaft, and provided with bars depending loosely from its ends, cross-bars or frames extending over the key-levers and adapted to be raised thereby, and said cross-bars adapted to raise respectively the two depending arms and to rock the shaft, all as set forth.

11. In a type-writer, the combination of a laterally-movable type-carrier, a rock-shaft for imparting to said carrier its lateral movement, a cross-bar extending on opposite sides of said shaft, the two rock-shafts H H' having respectively the lateral arms I I', and the arms of the two shafts extending in opposite directions, frames loosely suspended from said arms and crossing the key-levers, bent fingers c c extending from said shafts and respectively overlapping the two arms of the cross-bar when in their normal positions, all as set forth.

12. In a type-writer, the combination of a laterally-movable type-carrier, a rock-shaft for imparting to said carrier its lateral movement, a parallel cross-bar extending on opposite sides of said shaft, and provided with bars depending loosely from its ends, the two rock-shafts H H' having respectively the lateral arms I I' and the arms of the two shafts extending in opposite directions, frames loosely suspended from said arms, crossing the key-levers, and adapted to raise said depending arms, bent fingers c c extending from said shafts and respectively overlapping the two arms of a cross-bar extending in opposite directions from the rock-shaft for actuating the type-carrier, all as set forth.

13. In combination with the rock-shaft for imparting lateral motion to the type-carrier, the cross-bar G extending on opposite sides of said shaft, and having arms K K' loosely depending from the ends of said cross-bar, and each provided with a lateral shoulder, bars extending across the key-levers and adapted to be raised thereby, and having lateral projections for striking against the shoulders of the depending bars when said cross-bars are raised, all as set forth.

14. The type-carrier supported on a horizontal guide and capable of lateral movement thereon, a rock-shaft provided with both upwardly and downwardly extending arms, the upper arm connected with the type-carrier and adapted to give it lateral motion, a notched or serrated bar connected with said downwardly-extending arm, and a cross-bar resting on the key-levers, and provided with a projection for engaging with said notches, all as set forth.

15. The type-carrier supported on a horizontal guide and capable of lateral movement thereon, a rock-shaft provided with both upwardly and downwardly extending arms, the upper arm connected with the type-carrier and adapted to give it lateral motion, and the downwardly-extending arm connected with a device for locking said arm by the action of the key-levers, the cross-bar G' extending from opposite sides of the type-carrier laterally-actuating shaft, and tension-springs O' overlapping the arms of said bar, all as set forth.

16. In a type-writer, the combination of a laterally-movable type-carrier, a rock-shaft for imparting to said carrier its lateral movement, a downwardly-extending arm from said shaft, a cross-bar extending on opposite sides of said shaft, the two rock-shafts H H' having respectively the lateral arms I I' and the arms of the two shafts extending in opposite directions, frames loosely suspended from said arms and crossing the key-levers, arms loosely depending from the two ends of said cross-bar, and provided with lateral shoulders to be struck by lateral projections on the frames when they rise, nibs on the key-levers of varying heights situated under the suspended frames, whereby said frames may be raised the exact distance to bring the proper type in printing position, all as set forth.

17. In a type-writer, the combination of a laterally-movable type-carrier, a rock-shaft for imparting to said carrier its lateral movement, a downwardly-extending arm from said shaft, a cross-bar extending on opposite sides of said shaft, the two rock-shafts H H' having respectively the lateral arms I I' and the arms of the two shafts extending in opposite directions, frames loosely suspended from said arms and crossing the key-levers, arms loosely depending from the two ends of said cross-bar, and provided with lateral shoulders to be struck by lateral projections on the frames when they rise, nibs on the key-levers of varying heights situated under the suspended frames, whereby said frames may be raised the exact distance to bring the proper type in printing position, a movable bar loosely connected with the downwardly-extending arm of the type-carrier-propelling shaft a cross-bar resting on the key-levers and having means for locking said movable bar, and nibs 2 on the key-levers, situated under said cross-bars, each of a proper height to lock said cross-bar with the movable bar above it, when the nib 1 on the same lever has raised its frame to the proper position, all as set forth.

18. In combination with the lever-frame for supporting and raising the type-plate, the laterally-movable type-plate, and a horizontal rod passing through lugs in the type-plate holder, and frictionally held therein, and passing loosely through lugs in said lever-frame, all as set forth.

19. In a type-writer, the combination with a ribbon-spool, a rotatable support for said spool, a disk secured to said support, the hammer-arm, a connection between said arm and disk for rotating the same by the striking movement of the hammer-arm, and a spring clutch-detent having one end bearing upon the periphery of said disk for preventing its rotation in the direction opposite to that caused by the hammer-arm, all as set forth.

20. In a type-writer, the combination of a ribbon-spool, a rotatable support for said spool, a disk secured to said support, a lever fulcrumed to the bearing of said disk, a clutch-pawl pivoted to said lever, a clutch-detent, a tension-spring bearing on one end of said detent, and normally bearing the pawl into engagement with the periphery of the disk, whereby said disk will be made to turn in one direction and be prevented from turning in the opposite direction, all as set forth.

21. In a type-writer, the combination of a ribbon-spool, a rotatable support for said spool, a disk secured to said support, a lever fulcrumed to the bearing of said disk, a clutch-pawl pivoted to said lever, a clutch-detent, a tension-spring bearing on one end of said detent, and also normally bearing the pawl into engagement with the periphery of the disk, whereby said disk will be made to turn in one direction and be prevented from turning in the opposite direction, the hammer-arm, and a connection between said arm and pawl for operating the same by the movement of the arm, all as set forth.

22. In a type-writer, the combination of the longitudinal rail for supporting the paper-carriage, two longitudinal arms connected loosely to the rail at or near its outer ends respectively, and connected loosely together at their inner ends, a lever pivotally connected with said rail, and the shaft of said lever provided with operating-arms extending on opposite sides of the same, and a pivotal locking-plate for overlapping said arms and thus locking the same, all as set forth.

23. In combination with the rock-shaft for raising and lowering the paper-carriage, and provided with a downwardly-extending arm, two locking-arms pivoted on either side of said shaft, and when in their normal positions inclosing between their ends, the downwardly-extending arm, and means for swinging either or both of said locking-arms away from said shaft-arm, to unlock the same, all as set forth.

24. In combination with the rock-shaft for raising and lowering the paper-carriage, and provided with a downwardly-extending arm, two locking-arms pivoted on either side of said shaft, and when in their normal positions inclosing between their ends, the downwardly-extending arm, and means for swinging either or both of said locking-arms away from said shaft-arm, to unlock the same, and a tension-spring bearing against said locking-arms for returning the same to their normal locking positions, all as set forth.

25. In combination with the rock-shaft for raising and lowering the paper-carriage, and provided with a downwardly-extending arm, two locking-arms pivoted on either side of said shaft, and when in their normal positions inclosing between their ends, the downwardly-extending arm, and an oscillating arm bearing against beveled ends of said locking-arms for swinging them away from the downwardly-extending shaft-arm, all as set forth.

26. In combination with the rock-shaft for raising and lowering the paper-carriage, and provided with a downwardly-extending arm, the two locking-arms 3 and 4 pivoted on either side of said shaft and having at their free ends the slot 6, and when in their normal positions inclosing between their ends the downwardly-extending shaft-arm, and means for swinging said locking-arms so as to permit the shaft-arm to enter and ride in either of the slots, all as set forth.

27. In combination with the rock-shaft for raising and lowering the paper-carriage, and provided with a downwardly-extending arm, the two locking-arms 3 and 4 pivoted on either side of said shaft and having at their free ends the slot 6, and when in their normal positions inclosing between their ends on one side of said slots the downwardly-extending shaft-arm, and said ends on the other side of the slots being beveled, and an oscillating arm bearing against said beveled ends, all as set forth.

28. In combination with the rock-shaft for raising and lowering the paper-carriage and said shaft provided with a key on either side and also with a downwardly-extending arm, two locking-arms pivoted on either side of said shaft, and when in their normal positions inclosing between their ends the downwardly-extending shaft-arm, a rock-lever having a downwardly-extending arm in engagement with the locking-arms for moving the same, and also having a cross-bar with upward extensions passing through said keys, all as set forth.

29. In combination with the rock-shaft for raising and lowering the paper-carriage and said shaft provided with a key on either side, and also with a downwardly-extending arm, two locking-arms pivoted on either side of said shaft, and when in their normal positions inclosing between their ends the downwardly-extending shaft-arm, a loose sleeve incasing said shaft and provided with a downwardly-extending arm in engagement with the locking-arms for moving the same, and said sleeve also having a cross-bar with upwardly-extending ends passing through said keys, all as set forth.

30. In combination with the longitudinally-movable feed-rack, a vertical plate having a projection extending over said rack, and connected to its support by pins and slots, whereby it may be moved vertically, all as set forth.

31. In combination with the longitudinally-movable feed-rack, a vertical plate having a projection extending over said rack, and connected to its support by pins and slots, whereby it may be moved vertically, and a tension-spring tending to bear said plate downward to its normal position, all as set forth.

32. In combination with the rotary platen, and the ratchet on the same, a bell-crank lever operating in the same direction as the longitudinal movement of the carriage, a pawl engaging with said ratchet and pivoted loosely to an arm of said lever, and said arm having a lateral pin engaging with a hole in the pawl, all as set forth.

33. In combination with the rotary platen, and the ratchet on the same, a bell-crank lever operating in the same direction as the longitudinal movement of the carriage, a pawl engaging with said ratchet and pivoted loosely to the near arm of said lever, and said arm having a lateral pin engaging with a hole in the pawl, and a tension-spring bearing said pawl toward and against the ratchet, all as set forth.

Signed at New York, N. Y., this 14th day of March, 1898.

JOHN PRATT.

Witnesses:
 M. C. PINCKNEY,
 J. E. MCGOWEN.